United States Patent

[11] 3,555,355

[72] Inventors Anthony C. Pfister;
Roland L. Krieger; Gary J. Drinan,
Milwaukee, Wis.
[21] Appl. No. 772,168
[22] Filed Oct. 31, 1968
[45] Patented Jan. 12, 1971
[73] Assignee Allen-Bradley Company
Milwaukee, Wis.
a corporation of Wisconsin

[54] THERMISTOR CONTROLLED OVERLOAD
PROTECTION CIRCUIT
2 Claims, 1 Drawing Fig.
[52] U.S. Cl. .................................................. 317/13,
317/33, 317/41, 317/148.5
[51] Int. Cl. ........................................................ H02h 5/04,
H02h 7/06
[50] Field of Search............................................ 317/41,
148.5B, 33SCR, 13.3

[56] References Cited
UNITED STATES PATENTS
3,404,313  10/1968  Happel et al.................. 317/41
3,457,460  7/1969  Buiting et al.................. 317/41
Primary Examiner—James D. Trammell
Attorneys—Allan W. Leiser and Arthur H. Seidel ABSTRACT: An overload protection circuit for use with a relay coil includes a triac in the coil operating circuit, a DC supply which normally supplies an actuating signal to the triac, a silicon controlled rectifier adapted to shunt the triac actuating signal, and a trigger circuit for the SCR which includes a PTC thermistor. When the thermistor is cool the SCR is off but heating changes circuit conditions and causes the SCR to turn on whereupon the triac turns off. The preferred embodiment includes a normally open reset switch operable to shunt the SCR trigger signal and conduction current, and a bias resistance to hold the SCR on when the reset switch is closed while the thermistor is still hot.

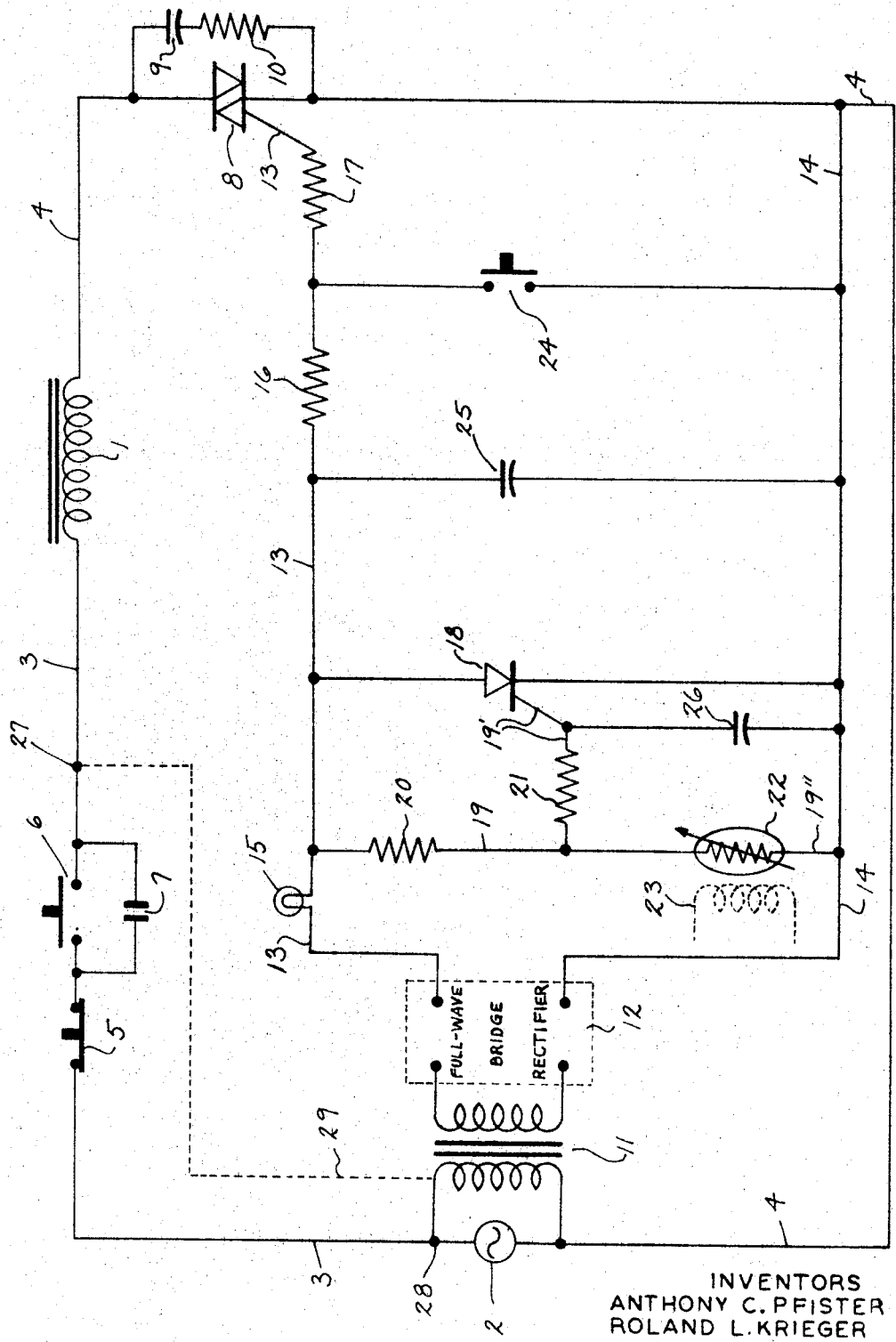

THERMISTOR CONTROLLED OVERLOAD PROTECTION CIRCUIT

BACKGROUND OF THE INVENTION

This invention relates to a thermistor controlled overload protection circuit for use with a relay coil or the like, and particularly to one which utilizes gating devices of the type requiring an actuating signal, preferably a triac and a silicon controlled rectifier. While gating devices and temperature-responsive resistances have previously been used to provide overload protection, not all prior circuits have been fully satisfactory. It is difficult, for example, to eliminate marginal operation or chattering where a temperature-responsive resistance is to be a primary control element. Prior circuits have sometimes failed to solve the chattering problem effectively, or have otherwise been unreliable or unduly expensive or complicated.

SUMMARY OF THE INVENTION

The present invention contemplates an overload protection circuit involving two gating devices of the type requiring an actuating signal to be conductive. The first is in the operating circuit for a coil or other device to be controlled, and the second is adapted to shunt an actuating signal for the first. The state of the second gating device is controlled by means of a thermistor which in effect varies the magnitude of an actuating signal supplied to the second gating device. In addition, the preferred embodiment of the invention includes a reset arrangement and a bias resistance to prevent transitory reactivation in the face of a continuing overload.

It is the object of the invention to provide an overload protection circuit of the foregoing type and capabilities which is highly effective and reliable while still being relatively simple and inexpensive and readily adaptable to various environments. These and other objects and advantages will be apparent from the description to follow.

BRIEF DESCRIPTION OF THE DRAWING

The Figure is a schematic electrical circuit diagram showing a preferred embodiment of the invention.

DESCRIPTION OF THE PREFERRED EMBODIMENT

In the drawing, the reference numeral 1 designates an electromagnetic coil which is connected to a conventional AC supply 2 by means of lines 3 and 4 which together constitute an operating circuit. The coil 1 is the primary controlled element of the circuit, and it might be the operating coil of an electromagnetic starter switch for a motor, or a circuit according to this invention might be used to control various devices other than a coil.

A conventional start-stop station is included in the operating circuit for the coil 1, and comprises a normally closed stop switch 5, a normally open start switch 6, and normally open auxiliary contacts 7 connected across the start switch 6. The contacts 7 are closed in response to picking up of the coil 1 in usual fashion to latch the operating circuit in an operating state upon closing of the switch 6. The particular form of start-stop station shown in not crucial to the invention, and various other forms of main switches might be used depending on operating requirements or the type of element controlled.

A triac designated by the reference numeral 8 is included in the operating circuit for the coil 1 and serves as a power gating device which opens or closes the circuit. The construction and operation of such triacs is known to those skilled in the art, and they are basically solid state, bidirectional AC switches which require an actuating signal input in order to be conductive. Thus, when an actuating signal of sufficient magnitude is received by the triac 8 it is conductive and the operating circuit for the coil 1 is completed allowing the coil to be picked up. When the actuating signal is reduced below the necessary magnitude, however, the triac 8 acts as an open switch opening the operating circuit for the coil 1. A capacitor 9 and resistance 10 are connected in parallel with the triac 8 and act to provide transient protection for the triac 8 and help to eliminate spurious triggering.

A stepdown signal transformer 11 is connected across the power supply 2 with its secondary connected to a full-wave, bridge type rectifier 12 of any suitable known type. The transformer 11 and rectifier 12 together serve as a DC supply means, and a signal output line 13 leads therefrom to the gate or actuating signal connection of the triac 8. The DC circuit is completed by a line 14 leading from the operating line 4 to the rectifier 12. An overload signal lamp 15 is connected in the output line 13, as are a bias resistance 16 and a current limiting resistance 17, the functions of which will be described.

A conventional silicon controlled rectifier 18 is connected across the lines 13 and 14 to be effectively in shunting relationship with the output line 13, and SCR 18 serving as a signal gating device which is adapted under overload conditions to shunt the actuating signal to the triac 8 to turn the triac off, as will be described in more detail hereinafter. The construction and operation of SCR's is also well known to those skilled in the art, and they function essentially as unidirectional, bistable solid state switches which require an actuating or trigger signal to be conductive. When a suitable trigger signal is applied to the SCR 18, it will become and remain conductive. In the absence or upon termination of such a signal, however, it acts as an open switch.

A trigger circuit designated generally by the reference numeral 19 is also connected across the lines 13 and 14, and is divided to define a trigger branch 19' which leads to the gate or actuating signal connection of the SCR 18 and a control branch 19'' which is effectively in shunt relationship with the trigger branch 19'. A fixed resistance 20 is connected in the main branch of the trigger circuit 19, and a second fixed resistance 21 is connected in the trigger branch 19'. Connected in the control branch 19'' is a thermistor 22 which has a positive temperature coefficient of resistance so that its resistance value increases upon an increase in temperature. The PTC thermistor 22 is suitably positioned in conventional fashion to be in heat transfer relationship with a heater coil 23 which would be in series with a motor or other device being protected in known fashion and is shown only in broken lines. The preferred embodiment shown is designed to protect a motor, but the invention could obviously be adapted to protect various devices.

A normally open reset switch 24 is also connected across the lines 13 and 14 and is effectively in shunt relationship with both the SCR 18 and the output line 13. The bias resistance 16 is in a reset circuit leading through the switch 24 as well as being in the signal line for the triac 8. A first filter capacitor 25 is connected across the lines 13 and 14, and a second filter capacitor 26 is connected between the branch line 19' and the line 14.

The values of the various components are selected so that under normal operating conditions the signal output line 13 supplies an actuating signal to the triac 8 that is of sufficient magnitude to cause the triac to be conductive; and as a result there is a completed operating circuit which allows the coil 1 to pick up when the start button 6 is operated. Under such normal conditions, the thermistor 22 is at a normal temperature or "cool," and has a relatively low resistance value. This value and the value of the resistances 20 and 21 are selected so that the trigger circuit 19 does not supply a trigger or actuating signal to the SCR 18 that is sufficient to cause the SCR to be conductive; and as a result the SCR 18 acts as an open switch under normal conditions. In the event of an overload, however, the heater coil 23 will heat which will in turn cause the temperature of the thermistor 22 to be elevated thereupon causing its resistance value to increase. Because of the parallel or shunt relationship of the branches 19' and 19'', this increase in resistance value will increase the magnitude of the trigger signal delivered to the SCR 18, and at a preselected point the signal value will be sufficient to cause the SCR 18 to become conductive. At this point, the SCR 18 will act as a closed switch and will effectively shunt the signal output line 13 thereby reducing the value of the actuating signal supplied to the triac 8 to a point where the triac 8 turns off.

Since the SCR 18 is a bistable device, it will remain on and the triac 8 will remain off until some further action is taken. Resetting of the circuit is accomplished through the reset switch 24. Assuming the thermistor 22 has cooled to the point where its resistance value is normal, closing of the switch 24 will effectively shunt both the trigger and conduction current of the SCR 18 causing it to turn off. Upon subsequent release of the switch 24, the bistable SCR 18 will remain off, and an actuating signal of sufficient magnitude will again be supplied to the triac 8, whereupon the operating circuit can be reactivated by actuating the start switch 6.

If the thermistor 22 has not cooled sufficiently by the time a resetting action is attempted, the operation is different and the bias resistance 16 then serves to prevent undesirable transitory reactuation. The bias resistance 16 is in the circuit of the switch 24, and this resistance in the reset circuit insures that there will be minimum holding current in both the trigger circuit 19 and the conduction circuit for the SCR 18. The value of the resistance 16 is selected, in conjunction with values of the several other components, so that if the switch 24 is closed while the thermistor 22 is still at a high resistance value the total trigger and conduction current for the SCR 18 will be sufficient to keep it turned on and the actuating signal for the triac 8 will continue to the shunted. Absent the protection thus afforded by the bias resistor 16, The SCR 18 would be shunted and turned off immediately upon closing of the switch 24. Upon release of the switch 24, the SCR 18 would not again be turned on for a few cycles of operation, and if the start button had for some reason been simultaneously depressed triac 8 would be turned on, allowing a momentary surge that could cause the motor to operate briefly which could cause injury or damage. The bias resistor 16 thus prevents the SCR 18 from turning off until the thermistor 22 has cooled a predetermined amount.

The indicator light 15 serves to indicate the state of the overload protection circuit. During normal operation, and although it is included in the output line 13, the light 15 remains off because insufficient current is drawn through it. Upon completion of a circuit through the SCR 18 as the result of an overload, however, the current through the lamp 15, which is in this circuit, increases and causes it to turn on; and it remains on during a resetting action because of the current drawn through it, the resistors 16 and the switch 24.

Several of the elements in the preferred circuit shown are not absolutely essential to the operation of the circuit per se, but they serve useful and conventional functions known to those skilled in the art. The resistors 20 and 21 together with the thermistor 22 control and enable selection of the proper trigger voltage for the SCR 18, the resistance value of the thermistor 22 at which the triac 8 is turned off, and the resistance value at which manual reset is possible. The resistor 17 serves, with the resistor 16, as a current limiting resistance to the gate of the triac 8. The capacitors 25 and 26 act as filters and additionally provide transient protection for the SCR 18.

Although the preferred embodiment of the invention requires manual resetting by actuation of the switch 24, it is possible with the same basic circuit arrangement to provide for an automatic resetting action. This accomplished by eliminating the reset switch 24 and its connections and connecting one side of the signal transformer 11 to the point 27 instead of the point 28 where it is connected in the embodiment shown, this alternative connection being illustrated by the broken line 29. With this variation, the signal transformer 11 and all the associated elements are controlled by the start-stop station so that upon dropout the DC supply is cut off, which causes the SCR 18 to turn off. The circuit can be reactivated by actuating the start button 6.

Although a preferred embodiment of the invention has been shown and described, it will be appreciated that various modifications might be made without departure from the spirit of the invention. The operation of the trigger circuit 19, for example, obviously depends on variations in resistance value, and while the preferred embodiment includes a branched circuit with the PTC thermistor 22 in the branch 19″ the same effect could be achieved by substituting an NTC thermistor for the resistance 20 or the resistance 21 or an unbranched circuit could be substituted, it being necessary only that there be a trigger circuit including at least one thermistor so that a trigger signal is provided in the event of heat indicating an overload. Similarly, a normally closed reset switch in series with the SCR 18 could be substituted for the switch 24 or other reset arrangements could be used, it being necessary for the manual reset operation only to have a manually operable switch which can effectively interrupt, by total or partial reduction the current flow through the SCR 18 to a point where it is below a holding value. Other components such as a quadrac might be substituted for the triac 8, and a triac, quadrac or other element might be substituted for the SCR 18. For these elements, it is only necessary that there by a gating device of any type which requires an actuating signal in order to be conductive. Similarly, although the particular type of DC supply shown in which there is a signal transformer connected across the power supply is highly effective, other DC supply means, such as separate batteries, might readily be substituted. Other forms of heater means might be used and, as previously indicated, other elements might be controlled or protected by the circuit. In view of the possible variations the invention is not intended to be limited by the showing therein or in any other manner except as may specifically be required.

We claim:

1. An overload protection circuit for use with a relay coil or the like that has an operating circuit, said overload protection circuit comprising: a power gating device which is connected in the operating circuit and which is of the type requiring an actuating signal to be conductive; DC signal supply means having a signal output line connected to an actuating signal connection of the power gating device and adapted to normally supply an actuating signal to the power gating device that is of sufficient magnitude to cause the same to be conductive; a signal gating device which is of the type requiring a trigger signal to be conductive and which is connected to the signal supply means in shunting relation with the signal output line, said signal gating device being bistable so that upon receiving a trigger signal it becomes and remains conductive and upon a reduction in current flow therethrough to a point below a predetermined value it becomes and remains nonconductive; and trigger circuit for the signal gating device that is connected to the signal supply means, said trigger circuit including a thermistor adapted to be acted on by a heater means that senses an overload condition, the resistance value of the thermistor being such that at normal operating temperatures the magnitude of the trigger signal is insufficient to cause the signal gating device to be conductive, while at an elevated temperature indicating an overload the magnitude of the trigger signal is sufficient to cause the signal gating device to be conductive which in turn shunts the actuating signal supplied to the power gating device causing the power gating device to cease being conductive; and a manually operable reset switch operatively associated with the signal gating device so that actuation of the reset switch effectively interrupts current flow through the signal gating device to a point where it becomes nonconductive.

2. An overload protection circuit according to claim 1 wherein: there is a reset line connected to the signal supply means that is in shunt relationship with the signal gating device and the reset switch is a normally open switch in the reset line; and there is a bias resistance in the reset line which insures sufficient current flow so that the signal gating device will remain conductive when the reset switch is closed while the thermistor is at an elevated temperature.